United States Patent [19]

Derman

[11] Patent Number: 4,489,548
[45] Date of Patent: Dec. 25, 1984

[54] TENSION SPRING DEVICE

[76] Inventor: Karl G. Derman, Sörgårdsvägen 7, S-433 00 Partille, Sweden

[21] Appl. No.: 392,771

[22] Filed: Jun. 28, 1982

Related U.S. Application Data

[63] Continuation-in-part of Ser. No. 119,215, Feb. 7, 1980, abandoned.

[30] Foreign Application Priority Data

Jul. 2, 1979 [SE] Sweden .................. 7901056

[51] Int. Cl.³ .................. F16G 13/00
[52] U.S. Cl. .................. 59/79.1; 59/901; 267/74; 267/153
[58] Field of Search .................. 59/3, 78, 79.1, 901; 267/73, 74, 153

[56] References Cited

U.S. PATENT DOCUMENTS

| | | | |
|---|---|---|---|
| 726,534 | 4/1903 | Hollicott | 267/73 |
| 1,517,138 | 11/1924 | Wike | 267/73 |
| 1,659,711 | 2/1928 | Smith | 59/78 |
| 2,020,943 | 11/1935 | Hallquist | 59/78 X |
| 2,079,689 | 5/1937 | Gorton | 59/78 X |
| 2,080,627 | 5/1937 | Morgan | 59/78 UX |
| 2,110,226 | 3/1938 | Hill | 59/78 |
| 3,002,409 | 10/1961 | Jones | 59/78 |
| 3,084,066 | 4/1963 | Dunmire | 59/78 |
| 3,298,173 | 1/1967 | Empson | 59/78 |
| 3,306,600 | 2/1967 | Roux et al. | 267/74 |
| 3,574,996 | 4/1971 | Loos | 59/78 |
| 3,775,969 | 12/1973 | Vasterling | 59/78 |

Primary Examiner—Daniel C. Crane
Assistant Examiner—David B. Jones
Attorney, Agent, or Firm—Holman & Stern

[57] ABSTRACT

A tension spring device comprising a linear draw element and spring member surrounding the draw element and connected thereto by connection sleeves.

11 Claims, 11 Drawing Figures

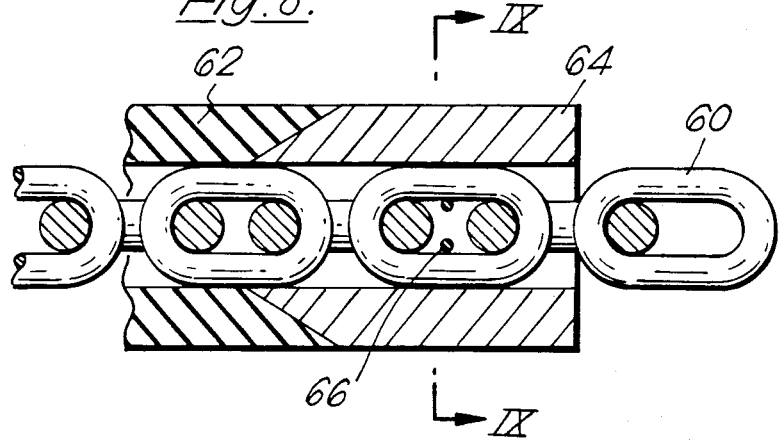
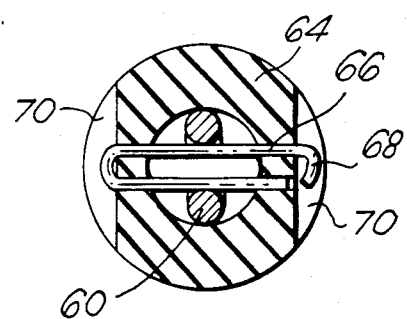
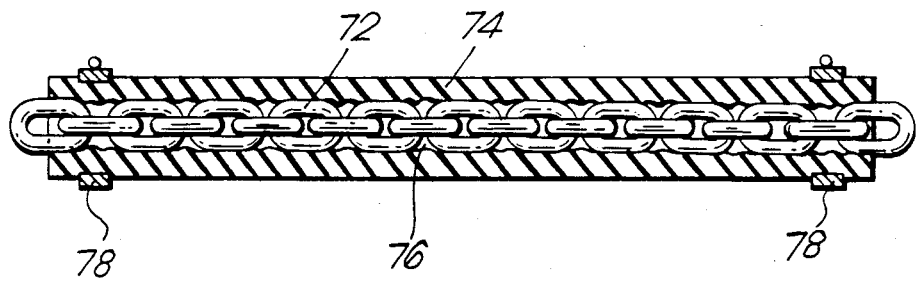

TENSION SPRING DEVICE

CROSS REFERENCE TO RELATED APPLICATION

This application is a continuation-in-part of my copending application Ser. No. 119,215 filed Feb. 7, 1980, now abandoned.

BACKGROUND OF THE INVENTION

1. Field of the Invention

The present invention relates to a tension spring device of the kind comprising a length of a draw member, preferably a length of chain consisting of connected links, and a spring element consisting of an elastic material, for example rubber, for imparting elastic properties to the draw member.

2. Description of the Prior Art

In several cases it is desirable to impart elastic properties to a draw member, especially a chain length. Thus, it is often desirable to combine the great tensile strength of the chain with elastic properties. For example when chains are used for the mooring of buoys, towing, anchoring of loads and other anchoring purposes it is advantageous to use an elastic chain length.

Of course it is possible to connect a chain length with any type of a conventional metal spring but for many reasons it is more advantageous to combine the chain length with an elastic material for providing a tension spring device. Thus, it is previously known to vulcanize a chain length into an elastic material, for example rubber, the spring action being provided for example by the fact that the links of the chain are during the vulcanization in a contracted position or by providing the links along a path deviating from a straight line.

The tension spring device of the kind described above, i.e. a chain length vulcanized into an elastic material, has good elastic properties and is also advantageous from other points of view. However, it is a drawback that such a tension spring device cannot be manufactured in any other place than in a factory and especially that a tension spring device of this kind is expensive and difficult to manufacture.

SUMMARY OF THE INVENTION

The object of the present invention is therefore to provide a tension spring device, which comprises a length of a draw member, preferably a length of a chain consisting of links connected with each other, and a spring element consisting of an elastic material, said device lacking the above drawbacks.

In order to comply with this object the tension spring device according to the present invention comprises a linear draw element means, a spring member means comprising an elastic elongated tube enclosing a given length of said draw element within its hollow center space, and a connection sleeve at each end of said spring member tube fixedly connecting the end to the draw element at each end of said given length, said spring member being in an initially untensioned state, and the given length of said draw element being in an initially contracted state; so that when tension is applied to the linear draw element along its linear axis, the initial shock of said tension is absorbed by the spring member, which is capable of stretching until the given length of the draw element is no longer contracted.

A tension spring device of this kind is very easy to manufacture and it is possible for individuals to impart elastic properties to a chain by providing the chain with a spring member means of the above kind.

In a preferred embodiment of the tension spring device according to the invention the spring member means is provided with reinforcements in the areas of the connection of the chain length to the spring member means.

It is suitable to design the hollow space in such a way that the walls defining the space contacts the chain links over a relatively large surface which provides that the elastic properties of the rubber elastic material are effectively utilized along the whole length of the spring element. For example the cross section of the hollow space can be cross-shaped when the chain length is of the conventional round link type.

BRIEF DESCRIPTION OF THE DRAWINGS

The invention will now be described in greater detail with reference to the accompanying drawings wherein:

FIG. 8 is an axial cross-sectional view of an end portion of a tension spring device according to the invention;

FIG. 9 is a cross-section on line IX—IX in FIG. 8.

FIG. 10 is an axial cross-sectional view of a further modified embodiment of a tension spring device according to the invention.

DETAILED DESCRIPTION

Figure 1:
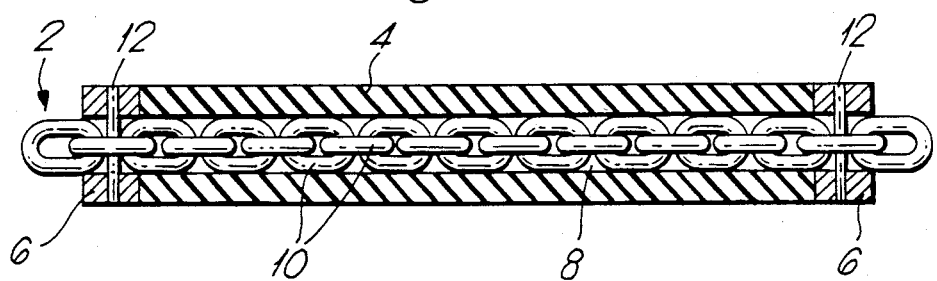
FIG. 1 is an axial cross-sectional view of a tension spring device according to the invention.

In FIG. 1 there is shown an axial section of a tension spring device consisting of a length 2 of conventional round link chain and an elongated spring member 4 of an elastic material, for example rubber, being provided at its end portions with connection sleeves 6. The sleeves 6 are firmly connected with the elastic material of the spring element by means of vulcanization. The spring member 4 is formed with an elongated space 8 which in the embodiment of FIG. 1 is of substantially circular cross-sectional shape. The space 8 has such a diameter that the walls defining the space rather firmly engage the outer surfaces of the links 10 of the chain length 2.

In the position shown in FIG. 1 wherein the tension spring device is not subjected to a tensional force the chain links 10 are contracted so that the ends of the links contact each other or at least are positioned at a short distance from each other. The chain length is connected with the connection sleeves 6 by means of locking pins 12 extending through the connection sleeves 6 and the chain links positioned opposite to the sleeves at the ends of the tension spring device.

It is recognized that a tension spring device of this kind can be manufactured in a very simple way and that it is possible to provide a chain which has already been in use with elastic properties by providing the chain with a spring member for constituting a tensional spring device according to the invention. When the portions of the chain positioned outside the spring member are subjected to a tensional force the tensional force is transferred to the spring member through the locking pins 12 and the connection sleeves 6. Because of the fact that the elastic material of the spring member closely engages the outer surfaces of the chain links, the tensional force also will be transferred to the spring member at the areas between because of the friction between each chain link and the surrounding elastic material of the spring member. Thereby the stress will be rather small in the areas of the end portions of the tension spring device even when the tensional forces are great.

Figure 2:
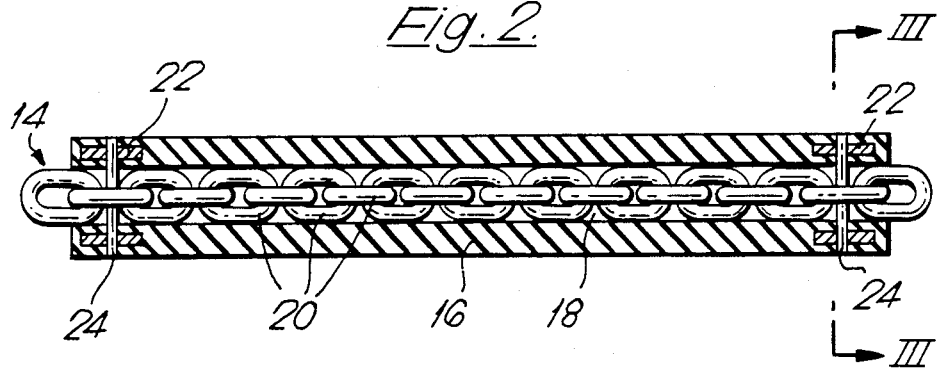
FIG. 2 is an axial cross-section view of another embodiment of a tension spring device according to the invention.
Figure 3:
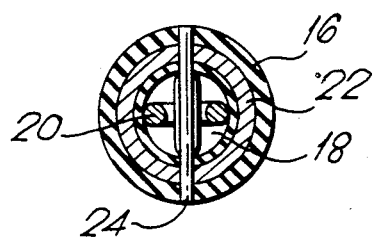
FIG. 3 is a cross-sectional view on line III—III in FIG. 2.

The embodiment of a tensional spring device according to the invention as shown in FIGS. 2 and 3 comprises a length 14 of conventional round link type and an elongated spring member 16 of an elastic material, for example rubber. The spring member 16 is formed with a hollow space 18 having circular cross-sectional shape. In this embodiment the space has such a diameter that the walls thereof firmly enclose the outer surfaces of the chain links 20. In the areas of the end portions of the spring element reinforcing metal rings 22 are vulcanized into the elastic material. The chain length 14 is connected with the spring member 16 by means of locking pins 24 extending through the reinforcing rings and the chain links positioned opposite thereto at the ends of the tension spring device.

The tension spring device according to FIGS. 2 and 3 has substantially the same function as the tension spring device according to FIG. 1.

FIGS. 4-7 show tension spring devices having different shapes of the hollow space of the spring member and different embodiments of the reinforcing means at the end portions of the tension spring device.

Figure 4:
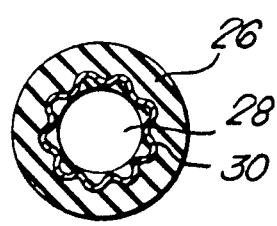
FIGS. 4–7 are cross-sections corresponding to FIG. 3 with the chain line omitted of further different embodiments of tension spring devices according to the invention.

In FIG. 4 there is shown a spring member 26 having a circular hollow space 28. At each end portion of the spring member there is provided reinforcing means 30 vulcanized into the spring member, the reinforcing means having corrugated shape so as to improve the guiding of the chain length by the fact that at a number of points the reinforcing means extend up to the surface defining the hollow space 28.

Figure 5:
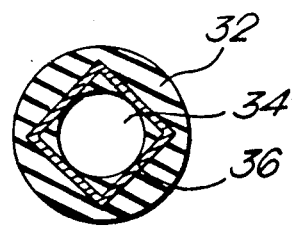

In FIG. 5 there is shown a tension spring device having a spring member 32 which is formed with a circular hollow space 34 for receiving a chain length. At its end portions the spring member has reinforcing means 36 vulcanized into the spring member and being of a square cross-sectional shape so that said means extends at four points to the surface defining the hollow space 34 in order to provide an improved guiding of a chain length positioned in the hollow space.

Figure 6:
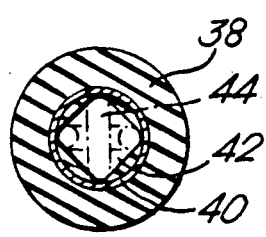

FIG. 6 shows a spring member 38 having circular reinforcing means 40. In order to provide high friction between the elastic material of the spring member 38 and a chain length introduced into the hollow space 42 of the spring member said space has a square cross-sectional shape. As shown by means of chain links 44 shown in broken lines the elastic material will engage the outer surface of the chain links over a larger surface when the hollow space 42 is of the shape shown in FIG. 6 than if the hollow space is of circular cross-sectional shape.

Figure 7:
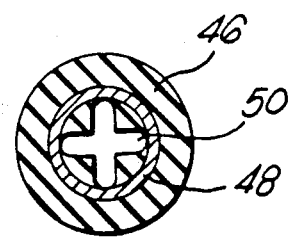

In FIG. 7 there is shown a spring member 46 which is provided with reinforcing means 48 at its end portions. In order further to increase the contact surface between the elastic material of the spring member 46 and a chain length introduced into the hollow space 50 of the spring member the hollow space is formed with a cross-shaped cross-section. In all embodiments of the tension spring device according to the invention shown in FIGS. 4-7 the chain length is connected with the spring members by means of locking pins of the same kind as shown in FIGS. 1-3.

In FIGS. 8 and 9 there is shown an end portion of an embodiment of a tension spring device according to the invention wherein the connection between the chain length and the spring member is of another type than in the embodiments described above. The tension spring device according to FIGS. 8 and 9 comprises a chain length 60 and a spring member 62 of an elastic material with a connection sleeve 64 at each end. The connection sleeve 64 is connected with the elastic material of the spring member by means of vulcanization, and in order to increase the size of the connection surface for making the connection stronger said surface extends obliquely to the cross-sectional plane. The chain length 60 is connected with the connection sleeve 64 by means of a U-shaped connection element 66 made from metal thread which is introduced through openings in the connection sleeve 64 and the chain link positioned opposite thereto. The connection element 66 is fixed in relation to the connection sleeve 64 by bending the end portion of one leg 68 of the connection member against the connection sleeve. The connection sleeve is provided with recesses 70 wherein the end portions of the connection member are received.

The embodiment of the tension spring device according to the invention shown in FIG. 10 comprises a chain length 72 and a spring member 74 consisting of an elastic material, for example rubber. The chain length 72 is positioned in an elongated hollow space 76 in the spring member 74. In order to provide increased friction between the chain length 72 and the spring member 74 the wall defining the hollow space 76 is formed with projections and depressions, whereby each chain length will transfer its stress to the elastic material of the spring member.

The spring member 74 is connected with the chain length 72 by means of peripherally extending clamping rings 78 of the hose clamp type which are positioned at the end portions of the spring member 74. The clamp rings 78 force the rubber elastic material against the chain links positioned inside said material to a sufficient degree for locking the end portions of the spring member in relation to the chain length.

Figure 11:
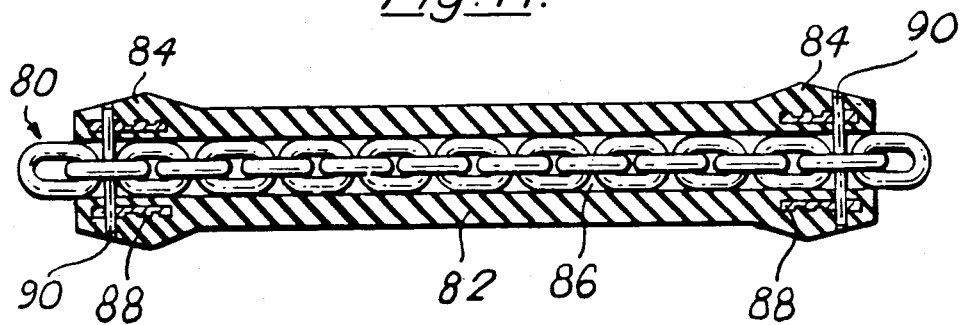
FIG. 11 is an axial cross-sectional view of another embodiment of a tension spring device according to the invention.

The embodiment of the tension spring device according to the invention shown in FIG. 11 comprises a chain length 80 and a spring member 82. The spring member 82 consists of an elastic material, for example rubber, and is provided with enlarged end portions 84. The chain length 80 is positioned in an elongated hollow space 86 in the spring member 82. It is preferred that the hollow space 86 is formed with a cross-shaped cross-section. In the areas of the enlarged end portions 84 of the spring member 82 reinforcing metal rings 88 are vulcanized into the elastic material. The chain length 80 is connected with the spring member 82 by means of locking pins 90 extending through the reinforcing rings 88 and the links of the chain length 80 positioned at the ends of the tension spring device.

In the embodiment according to FIG. 11 the ends of the tension spring device are formed so as to provide that substantially no tensioning of the device takes place at the ends thereof but only at the intermediate portion.

The invention can be modified within the scope of the disclosure. Thus, it is possible to provide the hollow space of the spring member with a large diameter in relation to the diameter of the chain length so that it is possible to receive a longer chain length in the hollow space by disposing the chain links in oblique position in the hollow space, the spring action length of the device being thereby increased.

It is also possible to increase the spring force of the tension spring device by providing means consisting of an elastic material between opposing surfaces of the chain links. These means can have a spherical shape and have recesses for receiving portions of the chain links. The spherical spring elements can have such an outer diameter that the elements engage the surface defining the hollow space in the spring member.

A tension spring device according to the invention also can comprise a wire as a draw element instead of a chain length. In such instance the wire is connected with the spring member in such a way that the wire extends in the hollow space of the spring member along a line deviating from a straight line, and the hollow space has a greater diameter than the wire.

I claim:

1. A tension spring device comprising: a linear draw element; a spring member means comprising an elastic elongated tube enclosing a given length of said draw element within its hollow center space; enlarged end portions on the ends of said tube having a greater outside diameter than the portion of said tube between the ends; an annular reinforcing ring made of rigid material embedded in each end portion of said tube; and means at each end of said spring member tube fixedly connecting each end to said draw element at each end of said given length, said spring member being in an initially untensioned state; so that when tension is applied to the linear draw element along its linear axis, the initial shock of said tension is absorbed by the spring member, which is capable of stretching until said given length of the draw element is no longer contracted.

2. The device of claim 1 wherein: said linear draw element comprises a conventional connected round-link chain whose links in said given length are in a contracted state; and the inner surface of the tube's hollow space is in frictional contact with links of said given length.

3. The device of claim 1 wherein a cross-section of the hollow space in the tube taken perpendicular to its linear axis defines a circle.

4. The device of claim 1 wherein a cross-section of the hollow space in the tube taken perpendicular to its linear axis defines a substantially cross-shaped configuration.

5. The device of claim 4 wherein the inner surface of the tube'hollow space is provided with projections for increasing the friction between the links of the chain length and the spring member.

6. The device of claim 1 wherein a cross-section of the hollow space in the tube taken perpendicular to its linear axis defines a substantially square configuration.

7. The device of claim 6 wherein the inner surface of the tube's hollow space is provided with projections for increasing the friction between the links of the chain length and the spring member.

8. The device of claim 3 wherein the inner surface of the tube's hollow space is provided with projections for increasing the friction between the links of the chain length and the spring member.

9. The device of claim 1 wherein said tube comprises a rubber material.

10. The device of claim 2 wherein said means for connecting each end of the spring member to the draw element comprises locking pins extending through said end portions of the tube and a link of the chain at each end of said given length.

11. The device of claim 10 wherein said locking pins further extend through said reinforcing rings.

* * * * *